United States Patent
Yu et al.

(10) Patent No.: US 9,022,670 B2
(45) Date of Patent: May 5, 2015

(54) FERRULE HOLDING MEMBER AND OPTICAL CONNECTOR

(71) Applicant: Hitachi Cable, Ltd., Tokyo (JP)

(72) Inventors: Juhyun Yu, Mito (JP); Hiroki Yasuda, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 208 days.

(21) Appl. No.: 13/735,844

(22) Filed: Jan. 7, 2013

(65) Prior Publication Data

US 2013/0183006 A1  Jul. 18, 2013

(30) Foreign Application Priority Data

Jan. 12, 2012  (JP) .................................. 2012-004018

(51) Int. Cl.
  *G02B 6/36*  (2006.01)
  *G02B 6/38*  (2006.01)

(52) U.S. Cl.
  CPC ................ *G02B 6/36* (2013.01); *G02B 6/3869* (2013.01); *G02B 6/3893* (2013.01); *G02B 6/3898* (2013.01)

(58) Field of Classification Search
  USPC ......................................... 385/78, 81, 83, 84
  See application file for complete search history.

(56) References Cited

U.S. PATENT DOCUMENTS

| | | | | |
|---|---|---|---|---|
| 6,533,468 | B2* | 3/2003 | Nakajima et al. ............... | 385/78 |
| 6,554,487 | B2* | 4/2003 | Nolan .............................. | 385/78 |
| 7,011,454 | B2* | 3/2006 | Caveney et al. ................ | 385/87 |
| 7,232,260 | B2* | 6/2007 | Takahashi et al. .............. | 385/76 |
| 7,534,051 | B2* | 5/2009 | Nishioka et al. ................ | 385/60 |
| 8,439,577 | B2* | 5/2013 | Jenkins ............................ | 385/78 |
| 8,496,384 | B2* | 7/2013 | Kuffel et al. .................... | 385/60 |
| 8,596,883 | B2* | 12/2013 | Taira et al. ....................... | 385/78 |
| 8,690,454 | B2* | 4/2014 | Tamekuni et al. ............... | 385/60 |

FOREIGN PATENT DOCUMENTS

JP  2000-39537 A  2/2000

* cited by examiner

*Primary Examiner* — Daniel Petkovsek
(74) *Attorney, Agent, or Firm* — McGinn IP Law Group, PLLC (57) ABSTRACT

A ferrule holding member has a tube-shaped receiving portion including a receiving space therein, the receiving space receiving at least partially a ferrule mounted to a terminal of an optical fiber; and an engaging portion engaged to the ferrule received in the receiving portion, to thereby regulate movement of the ferrule relative to the receiving portion. The receiving portion includes a communicating hole to allow the receiving space to communicate externally. The engaging portion includes an engaging protrusion configured to be inserted in the communicating hole from an outer periphery side of the receiving portion, to engage the ferrule.

4 Claims, 7 Drawing Sheets

FERRULE HOLDING MEMBER AND OPTICAL CONNECTOR

The present application is based on Japanese patent application No. 2012-004018 filed on Jan. 12, 2012, the entire contents of which are incorporated herein by reference.

BACKGROUND OF THE INVENTION

1. Field of the Invention

The present invention relates to a ferrule holding member for holding a ferrule mounted to a terminal of an optical fiber, and an optical connector.

2. Description of the Related Art

Traditionally, an adapter that is used to connect a pair of optical fibers together in which signals are transmitted by light, and that holds two ferrules mounted to ends of the pair of optical fibers, respectively, with tips of the ferrules butted together has been known as disclosed by e.g. Japanese Patent Laid-Open No. 2000-39537 (JP-A-2000-39537).

The adapter disclosed by JP-A2000-39537 includes a first insertion mounting portion for holding one ferrule pressed in an axial direction by a spring, and a second insertion mounting portion for holding the other ferrule locked by a locking claw. The second insertion mounting portion is divided into upper and lower sides by two slits extending parallel to a center axis of the other ferrule. When the other ferrule is demounted from the second insertion mounting portion, the second insertion mounting portion is deformed by external force pushing the upper and lower sides of the second insertion mounting portion apart from each other. This allows releasing the lock of the locking claw, and demounting the other ferrule from the second insertion mounting portion.

SUMMARY OF THE INVENTION

With the adapter disclosed by JP-A 2000-39537, since the entire second insertion mounting portion is exposed to the outside, e.g., when the ferrule is acted on by force along a direction of intersection with the center axis due to interference with another member, the lock of the locking claw may be released due to deformation of the upper or lower side of the second insertion mounting portion relative to the slits, and the ferrule may slip off.

Also, as shown in FIG. 3 of JP-A-2000-39537, when a tube-shaped prevention wall is provided around an outer side of the second insertion mounting portion, the second insertion mounting portion can be prevented from being acted on by unintended external force, but it is difficult to mount and demount the ferrule to and from the second insertion mounting portion.

Accordingly, it is an object of the present invention to provide a ferrule holding member and an optical connector, capable of securely holding a ferrule, and facilitating mounting and demounting of the ferrule.

According to a feature of the invention, a ferrule holding member comprises:

a tube-shaped receiving portion including a receiving space therein, the receiving space receiving at least partially a ferrule mounted to a terminal of an optical fiber; and an engaging portion engaged to the ferrule received in the receiving portion, to thereby regulate movement of the ferrule relative to the receiving portion, in which the receiving portion includes a communicating hole to allow the receiving space to communicate externally, in which the engaging portion includes an engaging protrusion configured to be inserted in the communicating hole from an outer periphery side of the receiving portion, to engage the ferrule.

In the ferrule holding member, the receiving portion may include a groove provided in an outer periphery and extended along a center axis of the receiving portion and an opening of the communicating hole provided in a bottom of the groove, the engaging portion may include a supporting portion to elastically support the engaging protrusion, and the supporting portion may be at least partially disposed in the groove with the engaging protrusion engaging the ferrule.

Further, the groove and the opening may be located in two opposite areas around the center axis of the receiving portion, and two of the engaging portions are provided in correspondence with the grooves and the openings in the two areas, respectively.

The ferrule holding member may further comprise:

gaps provided between the supporting portions and the bottoms of the grooves respectively, to insert tips of a tool into the gaps respectively to separate the supporting portions from the bottoms of the grooves respectively and disengage the engaging protrusions from the ferrule.

Still further, the receiving portion may comprise a plurality of tube-shaped members interlocked together in an axial direction of the receiving portion, the engaging portion may be a portion of an engaging member including a ring base sandwiched between the plurality of the tube-shaped members, and the supporting portion may be connected to the base at one end.

According to another feature of the invention, an optical connector comprises:

a fixed ferrule mounted to a terminal of an optical fiber; and a ferrule holding member which fixedly holds the fixed ferrule, the ferrule holding member comprising:

a tube-shaped receiving portion including a receiving space therein, the receiving space receiving at least partially an other ferrule mounted to a terminal of an other optical fiber; and an engaging portion engaged to the other ferrule received in the receiving portion, to thereby regulate movement of the other ferrule relative to the receiving portion, in which the receiving portion includes a communicating hole to allow the receiving space to communicate externally, in which the engaging portion includes an engaging protrusion configured to be inserted in the communicating hole from an outer periphery side of the receiving portion, to engage the other ferrule.

(Points of the Invention)

According to the present invention, it is possible to securely hold the ferrule, and facilitate mounting and demounting of the ferrule.

BRIEF DESCRIPTION OF THE DRAWINGS

The preferred embodiments according to the invention will be explained below referring to the drawings, wherein:

FIGS. 1A to 1C are diagrams showing an appearance of a housing and an optical connector 1 with the housing in the present embodiment, wherein

FIGS. 6A to 6C are diagrams showing one configuration example of a tool to demount the other ferrule from the optical connector, wherein

DETAILED DESCRIPTION OF THE PREFERRED EMBODIMENTS (Embodiment)

One configuration example of a ferrule holding member and an optical connector, and a ferrule mounting and demounting method in an embodiment according to the invention are described below, with reference to FIGS. 1A to 7.

Figure 1A:
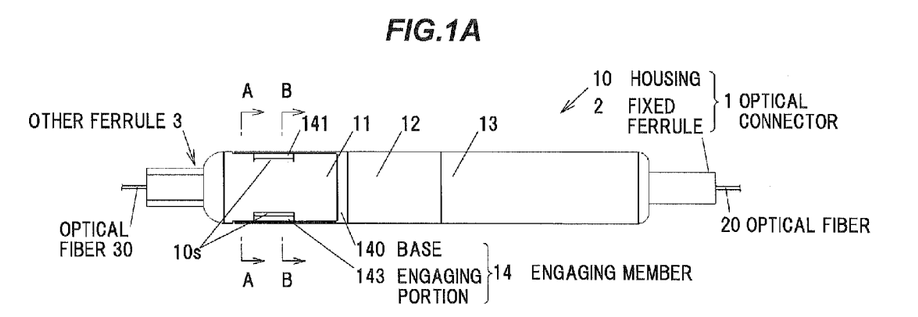
FIG. 1A is a top view thereof.
Figure 1B:
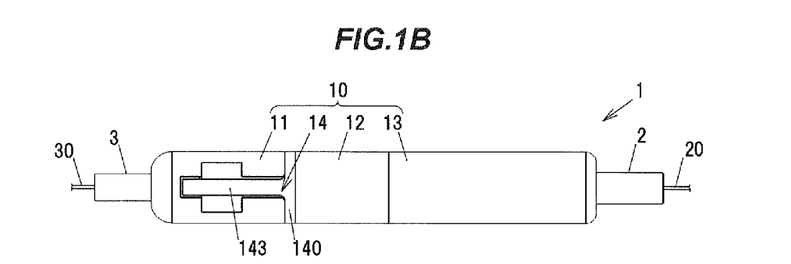
FIG. 1B is a front view thereof.
Figure 1C:
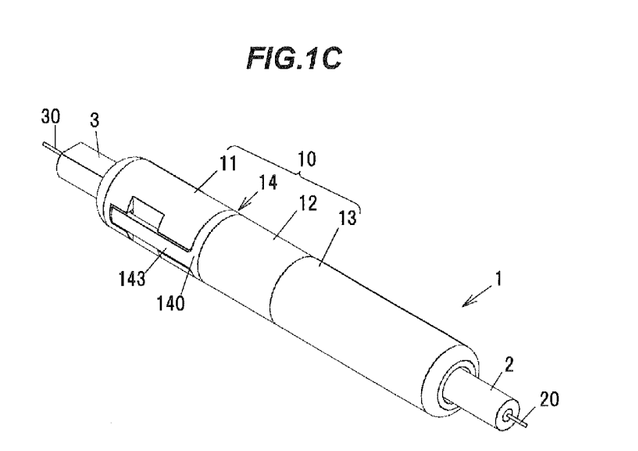
FIG. 1C is a perspective view.

FIGS. 1A, 1B, and 1C are a top view, a front view and a perspective view, respectively, showing an appearance of a housing 10 as a ferrule holding member and an optical connector 1 with the housing 10 in this embodiment.

The housing 10 includes a first cylindrical portion 11, a second cylindrical portion 12, a third cylindrical portion 13, and an engaging member 14. The first to the third cylindrical portions 11 to 13 and the engaging member 14 are made of a resin, such as PPS (polyphenylene sulfide), PI (polyimide), PEI (polyetherimide), PC (polycarbonate) or the like.

The respective diameters of an outer surface 110a of the first cylindrical portion 11, an outer surface 120a of the second cylindrical portion 12, and an outer surface 13a of the third cylindrical portion 13 are the same (i.e. common). This results in the entire assembly of the first to the third cylindrical portions 11 to 13 being shaped into a capsule except grooves 110b to be described later. The assembly of these first to third cylindrical portions 11 to 13 interlocked together corresponds to a receiving portion of the present invention. In addition, the first cylindrical portion 11, the second cylindrical portion 12, and the third cylindrical portion 13 are one example of a plurality of tube-shaped members. The diameter of the outer surface 110a, the outer surface 120a, and the outer surface 13a (the outer diameter of the housing 10) is e.g. 3 to 4 mm.

The engaging member 14 integrally includes a ring base 140, and a plurality of (in this embodiment, two) engaging portions 143. The base 140 of the engaging member 14 is sandwiched between the first cylindrical portion 11 and the second cylindrical portion 12, The housing 10 holds a fixed ferrule 2 mounted to a terminal of an optical fiber 20, and the other ferrule 3 mounted to a terminal of another optical fiber 30 different from the optical fiber 20. The housing 10 fixedly i.e. undemountably holds the fixed ferrule 2. In addition, the housing 10 demountably holds the other ferrule 3 together with the optical fiber 30.

The optical connector 1 is configured to include the housing 10 and the fixed ferrule 2. The insertion mounting of the other ferrule 3 to this optical connector 1 results in the fixed ferrule 2 and the other ferrule 3 being butted together in the housing 10, and optically connecting the optical fiber 20 and the optical fiber 30 together. This allows optical signal transmission from the optical fiber 20 to the optical fiber 30 or from the optical fiber 30 to the optical fiber 20.

Figure 2:
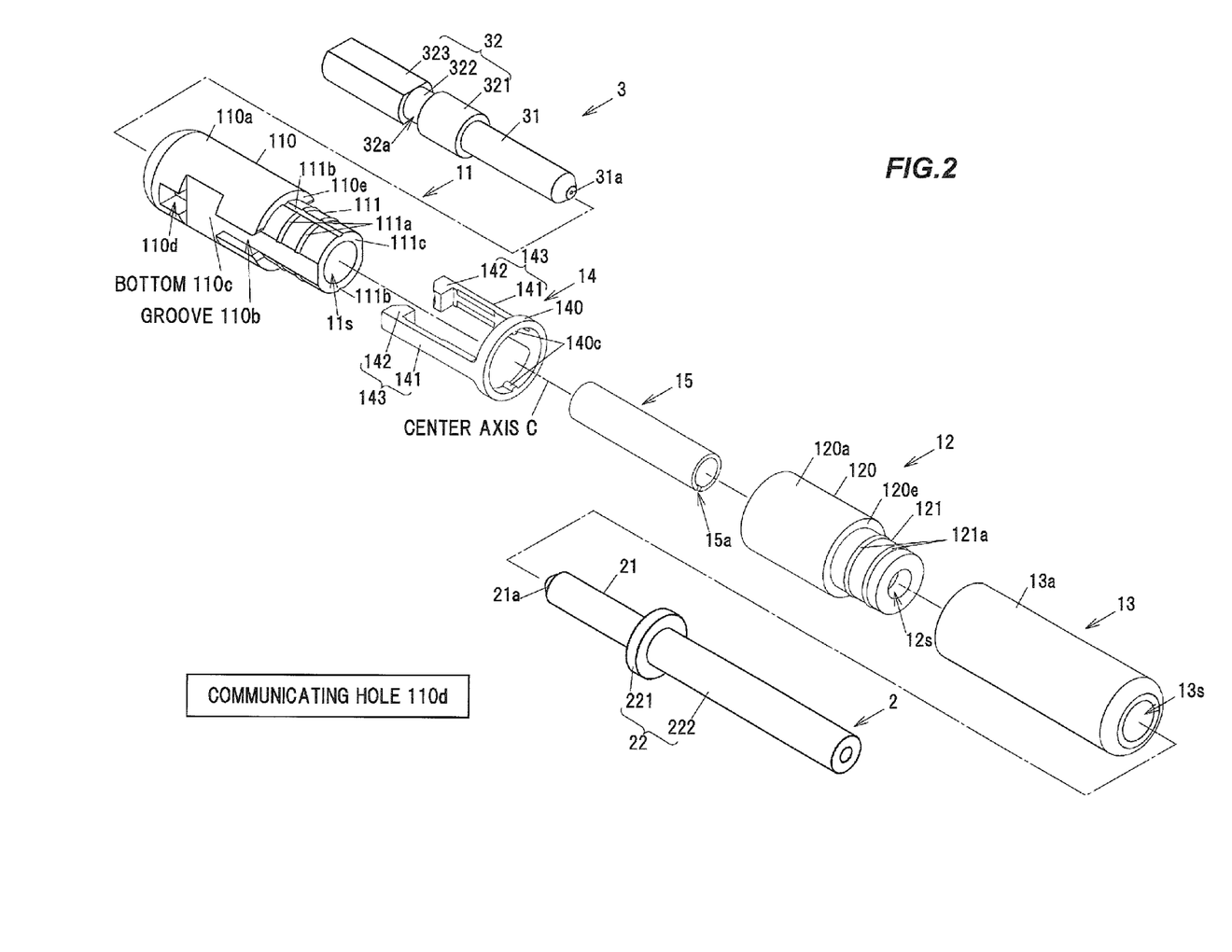
FIG. 2 is an exploded perspective view showing the optical connector and the other ferrule.
Figure 3:
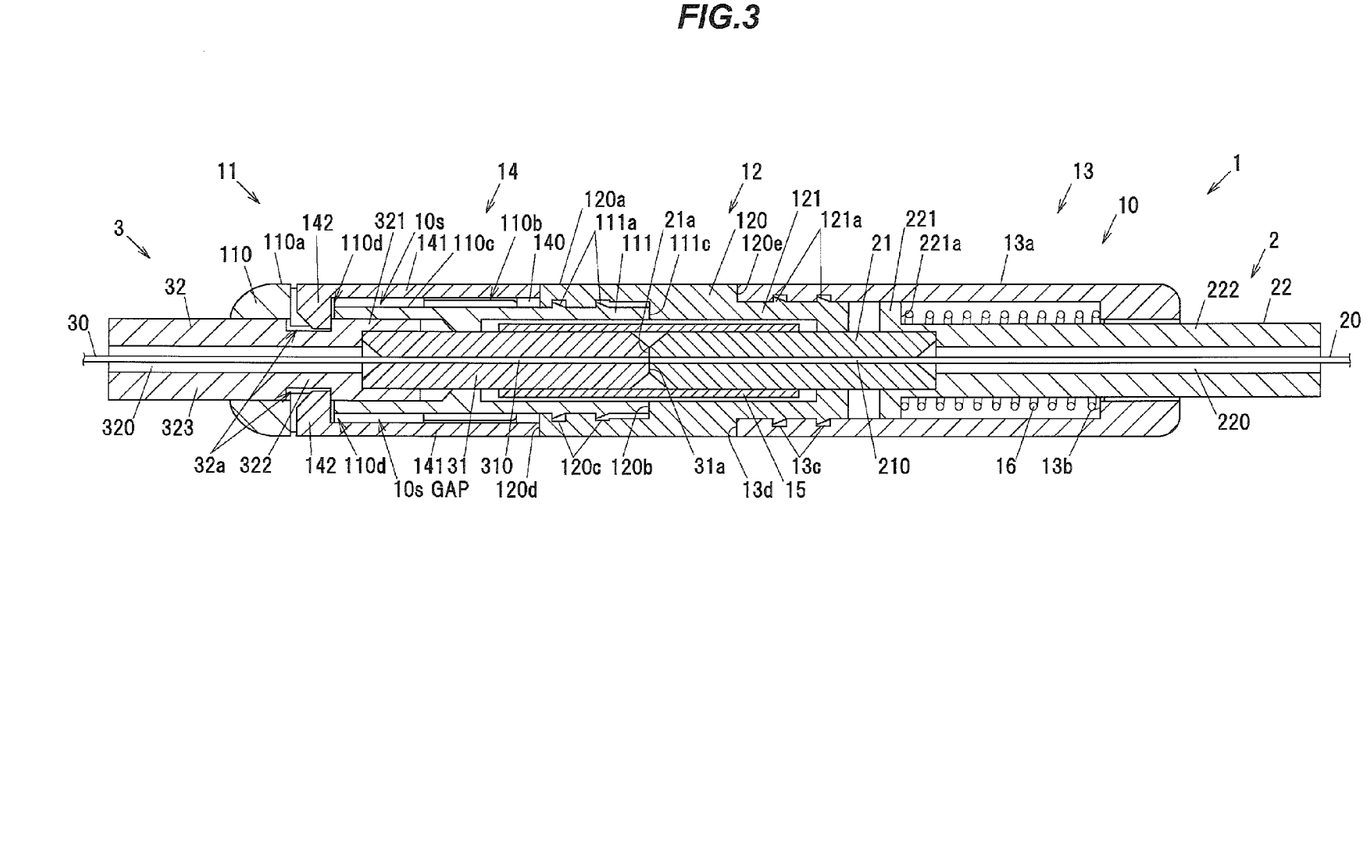
FIG. 3 is a cross-sectional view showing the optical connector and the other ferrule in a cross section taken along a center axis of the housing.
Figure 4:
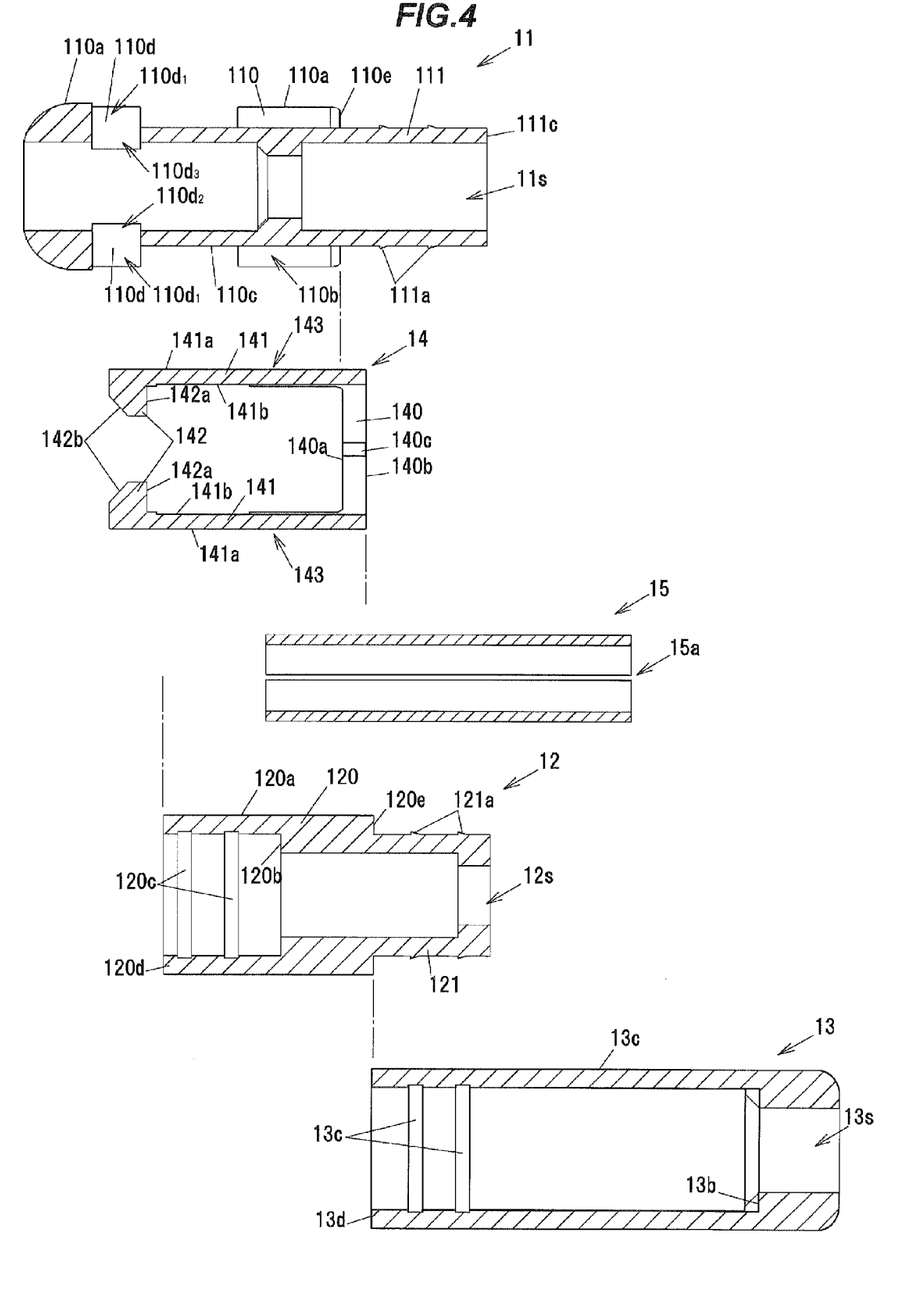
FIG. 4 is cross-sectional views showing first to third cylindrical portions, an engaging member, and a split sleeve, respectively, to be built in the housing.
Figure 5A:
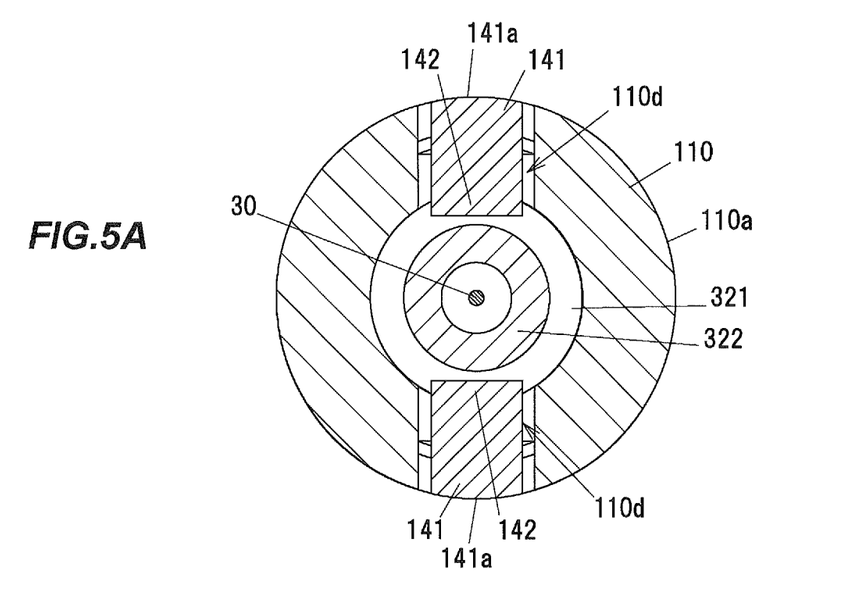
FIG. 5A is a cross-sectional view taken along line A-A in FIG. 1A.
Figure 5B:
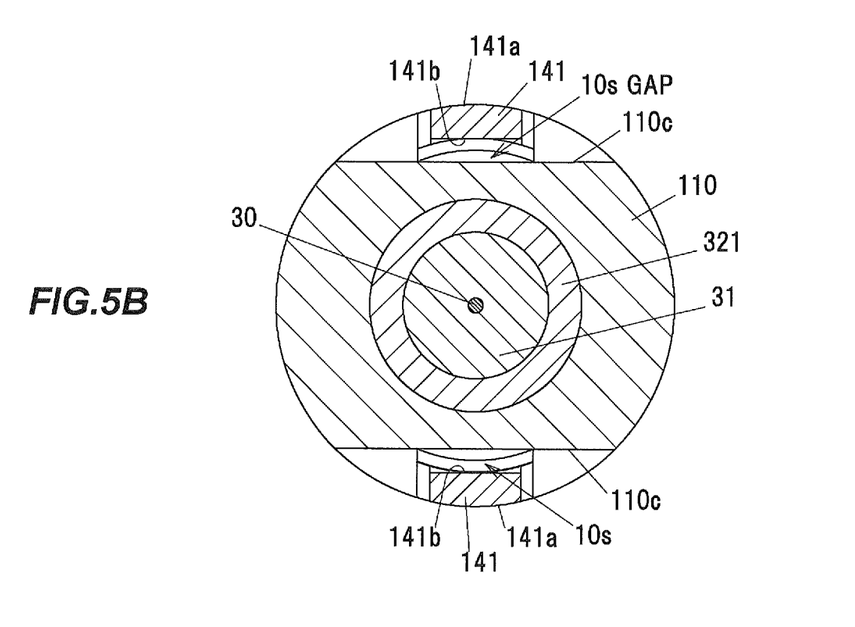
FIG. 5B is a cross-sectional view taken along line B-B in FIG. 1A.

FIG. 2 is an exploded perspective view showing the optical connector 1 and the other ferrule 3. FIG. 3 is a cross-sectional view showing the optical connector 1 and the other ferrule 3 in a cross section taken along the center axis C of the housing 10. FIG. 4 is cross-sectional views showing the first to the third cylindrical portions 11 to 13, the engaging member 14, and a split sleeve 15, respectively, to be built in the housing 10. In FIG. 4, the layout of the cross-sectional views showing each member is shown in such a manner as to vertically dispose diametrically overlapping portions around the center axis C. Further, FIG. 5A is a cross-sectional view taken along line A-A in FIG. 1A, and FIG. 5B is a cross-sectional view taken along line B-B in FIG. 1A.

The first cylindrical portion 11 integrally includes a body 110, and a protrusion 111. The body 110 and the protrusion 111 are both cylindrical and an inner portion thereof is formed with a receiving space 11s to receive a portion of the other ferrule 3. The protrusion 111 is formed to be smaller in outer diameter dimension than the body 110, and is provided at one end in the axial direction of the body 110.

The body 110 has grooves 110b in a periphery formed so as to extend along the center axis C. Respective bottoms 110c of the grooves 110b are planar, and in one end (on a side end to which the other ferrule 3 is inserted) of the grooves 110b, communicating holes 110d respectively are open so that the receiving space 11s communicates with the outside.

In this embodiment, a plurality (two) of the grooves 110b are formed in two opposite areas, respectively, around the center axis C of the body 110, and the two communication holes 110d are formed in correspondence with the grooves 110b, respectively. One groove 110b and the other groove 110b are formed in such a manner as to penetrate the body 110 in the radial direction. This results in outer openings $110d_1$ (shown in FIG. 4) of the communicating holes 110d being also formed in the two opposite areas, respectively, around the center axis C.

A stepped portion (level difference) between the body 110 and the protrusion 111 is formed with a ring stepped surface 110e. In addition, an outer surface of the protrusion 111 is formed with a plurality of protrusions 111a formed in a circumferential direction. In addition, the outer surface of the protrusion 111 is formed with a pair of grooves 111b extending parallel to the center axis C. The two grooves 111b are formed in symmetrical positions about the center axis C.

The second cylindrical portion 12 integrally includes a body 120 and a protrusion 121. The body 120 and the protrusion 121 are both cylindrical and the inner portion thereof is formed with a receiving space 12s to receive a portion of a tip of the other ferrule 3 and a portion of a tip of the fixed ferrule 2. The protrusion 121 is formed to be smaller in outer diameter dimension than the body 120, and is provided at one end in the axial direction of the body 120. A stepped portion between the body 120 and the protrusion 121 is formed with a ring stepped surface 120e. In addition, an outer surface of the protrusion 121 is formed with a plurality of protrusions 121a formed in a circumferential direction.

The entire third cylindrical portion 13 exclusive of a curved end face to be formed around an opposite end to the second cylindrical portion 12 has a circular cylindrical shape having the same outer diameter. An inner portion of the third cylindrical portion 13 is formed with a receiving space 13s to receive a portion of the fixed ferrule 2.

The receiving space 11s of the first cylindrical portion 11, the receiving space 12s of the second cylindrical portion 12, and the receiving space 13s of the third cylindrical portion 13 communicate with each other. In the receiving space of the inner portion of the housing 10 comprising the receiving spaces 11s, 12s, and 13s, there is received the cylindrical split sleeve 15 made of a resin such as PPS, PI, PEI, PC or the like. The split sleeve 15 is formed with a slit 15a parallel to the center axis C over its entire length.

The engaging member 14 includes a ring base 140 for the protrusion 111 of the first cylindrical portion 11 to be inserted through the center thereof, supporting protrusions 141 having a base end joined to one end face 140a (see FIG. 4) in the axial direction of the base 140, and extending parallel to the center axis C from the end face 140a in the axial direction, and engaging protrusions 142 provided at tips of the supporting protrusions 141 respectively. The supporting protrusions 141 and the engaging protrusions 142 constitute engaging portions 143. In the present embodiment, the engaging member 14 has the two engaging portions 143.

The two supporting protrusions 141 are rod-shaped to elastically support the engaging protrusions 142, and their respective inner surfaces 141b (see FIG. 4) are opposite each other around the center axis C. The two engaging protrusions 142 are erected on the inner surfaces 141b of the supporting protrusions 141 respectively in such a manner as to protrude toward the center axis C. The engaging protrusions 142 are formed with side surfaces 142a, respectively, on the base 140 side, which are orthogonal to the inner surfaces 141b of the supporting protrusions 141. The engaging protrusions 142 are also formed with tapered surfaces 142b, respectively, on the opposite side, which are tapered toward the tips of the engaging protrusions 142.

The base 140 is formed with a pair of protrusions 140c on an inner surface thereof. The pair of protrusions 140c are formed on two symmetrical positions, respectively, about the center axis C, and have a size and a shape to fit the pair of grooves 111b formed in the outer surface of the protrusion 111 of the first cylindrical portion 11. The pair of protrusions 140c are received in the pair of grooves 111b respectively, so that the base 140 is circumferentially positioned around the first cylindrical portion 11.

The fixed ferrule 2 is configured to include a body 21, and a holder 22 provided separately from the body 21, and mated to one end of the body 21. A tip 21a of the body 21 is formed in a tapered shape. The holder 22 integrally includes a shaft 222, and a flange 221 having an outer diameter greater than that of the shaft 222 and formed around a body 21 side end of the shaft 222.

As shown in FIG. 3, the body 21 is formed with an insertion hole 210 for the optical fiber 20 to be inserted through the center thereof, and this insertion hole 210 communicates with a through-hole 220 of the holder 22. The inner diameter dimension of the insertion hole 210 is slightly greater than the outer diameter dimension of the optical fiber 20, and the inner diameter dimension of the through-hole 220 is formed to be greater than the inner diameter dimension of the insertion hole 210.

The other ferrule 3 is configured to include a body 31, and a holder 32 provided separately from the body 31, and mated to one end of the body 31. A tip 31a of the body 31 is formed in a tapered shape.

As shown in FIG. 3, the body 31 is formed with an insertion hole 310 for the optical fiber 30 to be inserted through the center thereof, and this insertion hole 310 communicates with a through-hole 320 of the holder 32. The inner diameter dimension of the insertion hole 310 is slightly greater than the outer diameter dimension of the optical fiber 30, and the inner diameter dimension of the through-hole 320 is formed to be greater than the inner diameter dimension of the insertion hole 310.

The holder 32 integrally includes a small diameter cylindrical portion 322, and two large diameter cylindrical portions 321 and 323 formed along the center axis to sandwich the cylindrical portion 322 therebetween from both sides. Of the two large diameter cylindrical portions 321 and 323, one large diameter cylindrical portion 321 is formed on the body 31 side relative to the small diameter cylindrical portion 322, and the outer diameter dimension of that large diameter cylindrical portion 321 is formed to be greater than the outer diameter dimension of the small diameter cylindrical portion 322. The other large diameter cylindrical portion 323 is shaped to include two chamfered circumferential areas, and the outer diameter dimension of an unchamfered portion thereof is equal to the outer diameter dimension of one large diameter cylindrical portion 321. This configuration results in the holder 32 being formed with ring recesses 32a in portions, respectively, corresponding to the small diameter cylindrical portion 322.

Next is described an assembled structure of the housing 10 and the optical connector 1 with reference to FIGS. 3 to 5. In FIGS. 3 and 5, the engaging protrusions 142 of the engaging member 14 are shown to engage the recesses 32a, respectively, of the other ferrule 3.

The first to the third cylindrical portions 11 to 13 are interlocked together in the axial direction. More specifically, they are interlocked together by mating a protruding portion 111 of the first cylindrical portion 11 to the second cylindrical portion 12, and mating a protruding portion 121 of the second cylindrical portion 12 to the third cylindrical portion 13. A plurality of protrusions 111a of the protruding portion 111 are locked into ring depressions 120c, respectively, formed around an inner surface of the body 120 of the second cylindrical portion 12, and an end face 111c of the protruding portion 111 is butted to a stepped surface 120b formed around an inner circumference of the body 120. Also, a plurality of protrusions 121a around the protruding portion 121 are locked into ring depressions 13c, respectively, formed around an inner surface of the third cylindrical portion 13, and an end face 13d of the third cylindrical portion 13 is butted to an outer stepped surface 120e of the second cylindrical portion 12.

Further, the third cylindrical portion 13 is formed with a stepped surface 13b around an inner circumference thereof which faces a side surface 221a of the flange 221 formed around the holder 22 of the fixed ferrule 2. Between the side surface 221a and the stepped surface 13b, there is disposed a coil spring 16 for biasing the fixed ferrule 2 toward the second cylindrical portion 12.

The base 140 of the engaging member 14 is sandwiched between the first cylindrical portion 11 and the second cylindrical portion 12. More specifically, one end face 140a in the axial direction of the base 140 faces the stepped surface 110e of the first cylindrical portion 11, while the other end face 140b (see FIG. 4) in the axial direction of the base 140 faces an end face 120d (see FIG. 4) of the body 120 of the second cylindrical portion 12 so that the base 140 is sandwiched and held between the stepped surface 110e of the first cylindrical portion 11 and the end face 120d of the second cylindrical portion 12.

The supporting protrusions 141 of the engaging member 14 are partially disposed in the grooves 110b, respectively, of the first cylindrical portion 11. More specifically, as shown in FIG. 5A, portions of the supporting protrusions 141 including outer surfaces 141a with a circular arc cross section protrude outward from the grooves 110b, respectively, and the remaining portions thereof are received in the grooves 110b, respectively. The outer surfaces 141a of the supporting protrusions 141 have a curvature in common with the outer surface 110a of the first cylindrical portion 11, and are formed so that, with the engaging protrusions 142 engaging the recesses 32a in the other ferrule 3, the outer surface 110a and the outer surfaces 141a of the supporting protrusions 141 form a continuous curved surface (circumferential surface).

Between the bottoms 110c of the grooves 110b and the inner surfaces 141b of the supporting protrusions 141, there are formed gaps 10s, respectively. The bottoms 110c are formed in such a manner that portions (a portion on a side of the communicating hole 110d) thereof extend in a direction parallel to the center axis C and are continuous with the outer surface 110a of the body 110 at both ends, respectively, in this direction. This makes the gaps 10s visible from the outside of the housing 10, as shown in FIG. 1A. In this embodiment, since the engaging member 14 has the two engaging portions 143, the two gaps 10s formed between the respective supporting protrusions 141 of the two engaging portions 143 and the bottoms 110c are visible simultaneously.

In other words, the body 110 of the first cylindrical portion 11 is notched in the portions of the outer surface 110a by the two opposite parallel planes around the center axis C, in such a manner that these notched portions are configured as the portions of the bottoms 110c.

The outer openings $110d_1$ (see FIG. 4) of the communicating holes 110d are formed in portions of the bottoms 110c respectively, while inner openings $110d_2$ are formed in the inner surface of the first cylindrical portion 11. The engaging protrusions 142 of the engaging member 14 are inserted into the communicating holes 110d from outer sides respectively of the housing 10, to engage the other ferrule 3. More specifically, the engaging protrusions 142 are inserted from the outer openings $110d_1$ into the communicating holes 110d respectively, so that the tips thereof pass through the inner openings $110d_2$ respectively, enter the receiving space 11s of the first cylindrical portion 11, and engage the recesses 32a respectively formed in the holder 32 of the other ferrule 3. This engagement allows the other ferrule 3 to be prevented from slipping off the housing 10.

The split sleeve 15 is received in the housing 10 across the receiving space 11s of the first cylindrical portion 11, the receiving space 12s of the second cylindrical portion 12, and the receiving space 13s of the third cylindrical portion 13. The body 21 of the fixed ferrule 2 is inserted into the split sleeve 15 from one side in the axial direction, while the body 31 of the other ferrule 3 is inserted thereinto from the opposite side. The insertion of the body 31 and the body 21 into the split sleeve 15 widens the spacing in the circumferential direction of the slit 15a of the split sleeve 15.

In the middle of the split sleeve 15, the tip 21a of the body 21 and the tip 31a of the body 31 are butted together by the biasing force of the coil spring 16 (the stretching force of the spring). In addition, the body 21 of the fixed ferrule 2 and the body 31 of the other ferrule 3 are centered by the elasticity of the split sleeve 15. This allows optical connection of the optical fiber 20 and the optical fiber 30 and optical communication using the optical fiber 20 and the optical fiber 30 as an optical transmission medium.

(The Other Ferrule 3 Mounting and Demounting Method)

Next is described a method for mounting and demounting the other ferrule 3 to and from the optical connector 1.

For insertion mounting of the other ferrule 3 to the optical connector 1, the body 31 and the holder 32 are inserted into the receiving space 11s from one end of the first cylindrical portion 11. In this inserting step, the tapered surfaces 142b of the engaging protrusions 142 of the engaging member 14 come into contact with an end of the holder 32 (the large diameter cylindrical portion 321), to push the spacing between the pair of engaging protrusions 142 apart. The holder 32 is inserted more deeply into the receiving space 11s, so that the large diameter cylindrical portion 321 passes onto the inner sides of the inner openings $110d_2$ of the communicating holes 110d, and the engaging protrusions 142 engage the recesses 32a respectively. This allows the other ferrule 3 to be prevented from slipping off.

Although the other ferrule 3 is acted on by the biasing force of the coil spring 16 in the direction of slipping out from the housing 10, this force is received by the engaging protrusions 142 of the engaging member 14, and the tip 31a of the other ferrule 3 (the body 31) is butted to the tip 21a of the fixed ferrule 2 (the body 21).

On the other hand, for demounting of the other ferrule 3 from the optical connector 1, a tool with plate-shaped tips is used.

Figure 6A:
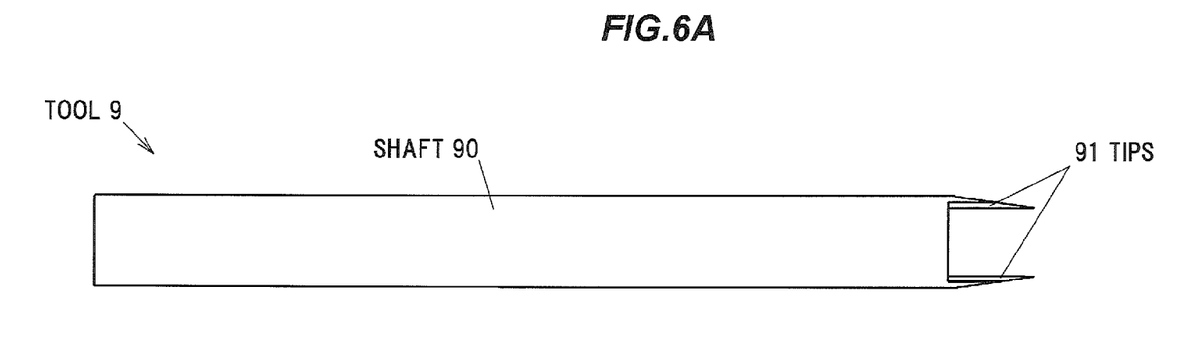
FIG. 6A is a top view thereof.
Figure 6B:
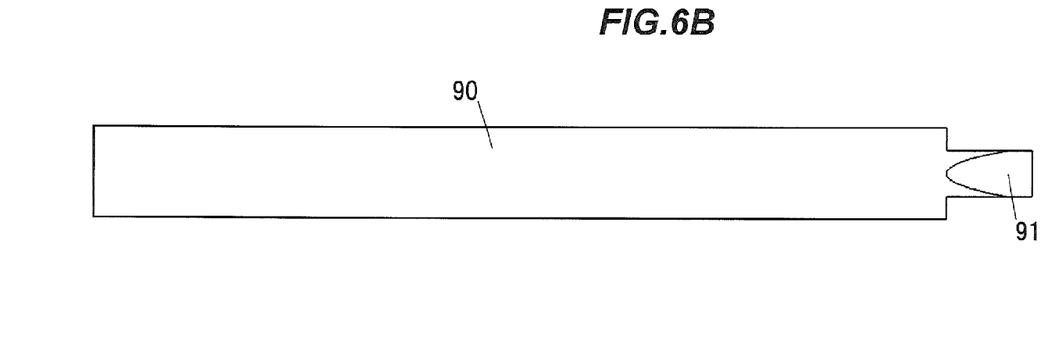
FIG. 6B is a front view thereof.
Figure 6C:
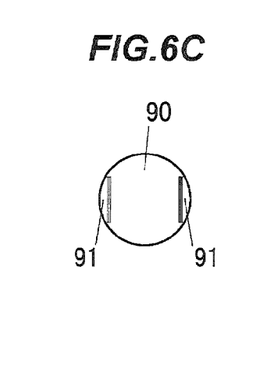
FIG. 6C is a side view thereof.

FIGS. 6A, 6B, and 6C are a top view, a front view and a side view, respectively, showing one configuration example of a tool 9 to demount the other ferrule 3 from the optical connector 1.

This tool 9 is a specialized tool, each portion of which is formed to fit the shape and size of the optical connector 1, and has a columnar shaft 90, and a pair of tips 91 provided on one end of the shaft 90. The tips 91 are flat plate-shaped and are formed to be thinner in thickness toward their respective ends. The spacing between the pair of tips 91 is configured to fit the spacing between the two gaps 10s formed between the pair of supporting protrusions 141 of the engaging member 14 and the bottoms 110c, respectively. That is, the spacing and thickness of the pair of tips 91 are configured so that the pair of tips 91 are inserted into the two gaps 10s respectively by moving the shaft 90 toward the optical connector 1 with the shaft 90 of the tool 9 being orthogonal to the center axis C of the housing 10, and with the tips 91 being parallel to the bottoms 110c.

Figure 7:
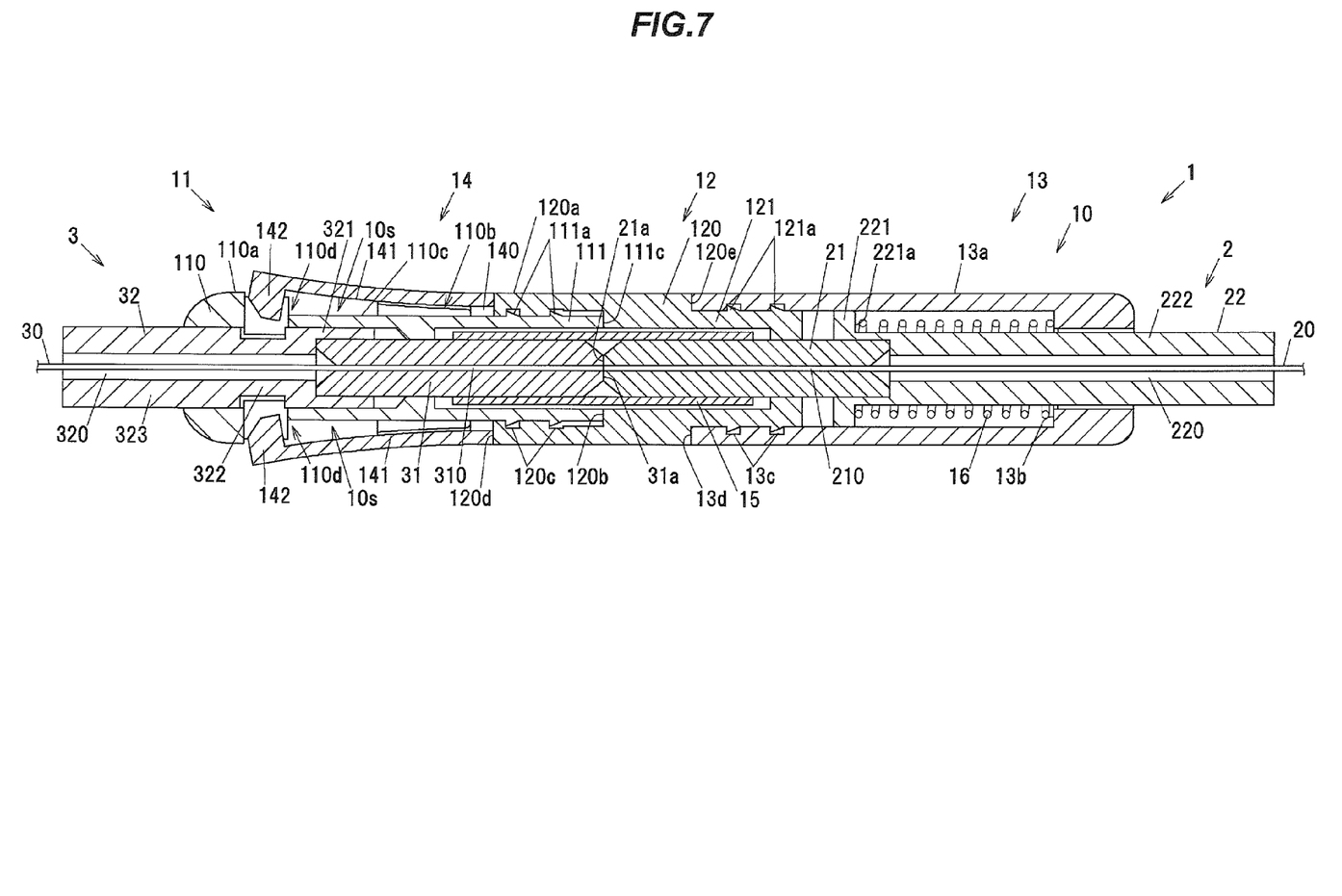
FIG. 7 is a cross-sectional view showing the optical connector and the other ferrule with the engaging protrusions disengaged from the other ferrule.

The insertion of the tips 91 of the tool 9 into the gaps 10s allows the supporting protrusions 141 to be separated from the bottoms 110c of the grooves 110b respectively, and displaced in such a manner as to slip out from the communicating holes 110d respectively, resulting in the disengagement of the engaging protrusions 142 from the recesses 32a respectively of the other ferrule 3, as shown in FIG. 7. This allows demounting of the other ferrule 3 from the optical connector 1. In addition, the displacement of the engaging protrusions 142 results in tip side (engaging protrusion 142 side) portions of the supporting protrusions 141 elastically deforming in such a manner as to circumferentially slip out from the grooves 110b beyond extended lines respectively of the outer surface 110a of the first cylindrical portion 110. Extracting the tips 91 of the tool 9 from the gaps 10s then allows the engaging protrusions 142 and the supporting protrusions 141 to be restored into the communicating holes 110d and the grooves 110b, respectively.

(Functions and Advantages of the Present Embodiment)

According to the embodiment described above, the following functions and advantages are provided.

(1) The engaging protrusions 142 are inserted from the outer sides into the communicating holes 110d respectively of the first cylindrical portion 11 to engage the other ferrule 3, to regulate the movement of the other ferrule 3 in the housing 10. That is, the engaging protrusions 142 engage the recesses 32a of the other ferrule 3, thereby preventing the other ferrule 3 from slipping off. This allows the engaging protrusions 142 to be not disengaged from the other ferrule 3 as long as they are not acted on by external force in the direction along the communicating holes 110d. It is therefore possible to prevent the unintended disengagement of the engaging protrusions 142 from the other ferrule 3.

(2) Since the holder 32 of the other ferrule 3 is received and held in the housing 10, even if the other ferrule 3 portion protruding from the housing 10 is acted on by external force in the direction of intersection with the center axis thereof, that external force is received primarily by the housing 10. Since the first to the third cylindrical portions 11 to 13 of the housing 10 each comprise one cylindrical member, and no slit as in the second insertion mounting portion described in JP-A-2000-39537 above for example is formed, the amount of deformation even due to that external force is reduced. This allows the supporting protrusions 141 and the engaging protrusions 142 to be not acted on by such a force as to disengage the engaging protrusions 142 from the other ferrule 3. The other ferrule 3 is therefore securely held to the housing 10.

(3) The recesses 32a provided in the middle of the holder 32 of the other ferrule 3 are engaged to the engaging protrusions 142, respectively. Therefore, when the holder 32 protruding from the housing 10 is acted on by a force in a radial direction, the other ferrule 3 will pivot around the recesses 32a in such a manner as to be tilted with respect to the housing 10. In this manner, the engaging protrusions 142 are configured so as not to be structurally disengaged from the recesses 32a. The other ferrule 3 is therefore more securely held to the housing 10.

(4) Since the engaging member 14 is separate from the first cylindrical portion 11 and the second cylindrical portion 12, the gaps between the first cylindrical portion 11 and the second cylindrical portion 12 and the other ferrule 3 can be small with the engaging protrusions 142 being engageable with and disengageable from the recesses 32a. This allows stably holding the posture of the other ferrule 3 in the housing 10.

(5) Since the portions of the supporting protrusions 141 are disposed in the grooves 110b respectively with the engaging protrusions 142 engaged to the other ferrule 3, it is possible to prevent disengagement of the engaging protrusions 142 from the other ferrule 3 due to the engaging portions 143 being acted on by an unintended external force. That is, although when the entire engaging portions 143 are exposed to the outside, the engaging protrusions 142 are highly likely to be accidentally disengaged from the other ferrule 3 due to interference with another member, for example, but disposing the supporting protrusions 141 in the grooves 110b respectively allows preventing the unintended disengagement of the engaging protrusions 142 from the other ferrule 3.

(6) The grooves 110b and the engaging portions 143 are formed for the plural areas (two areas). Therefore, even in the event of accidental disengagement of the engaging protrusion 142 of one of the engaging portions 143 from the other ferrule 3, the other ferrule 3 can be maintained by the other engaging portion 143 to prevent slipping off.

(7) Since the gaps 10s for the tips 91 of the tool 9 to be inserted thereinto are formed between the bottoms 110c and the supporting protrusions 141 respectively, it is possible to detach the supporting protrusions 141 from the bottoms 110c with the tool 9, and therefore facilitate the disengagement of the engaging protrusions 142 from the other ferrule 3.

(8) Since the base 140 of the engaging member 14 is sandwiched between the first cylindrical portion 11 and the second cylindrical portion 12, it is possible to hold the engaging member 14 with the simple configuration, and therefore facilitate the assembly.

(9) Since with the engaging protrusions 142 engaging the recesses 32a in the other ferrule 3, the outer surface 110a of the first cylindrical portion 11 and the outer surfaces 141a of the supporting protrusions 141 constitute the continuous curved surface, the outer surface of the housing 10 is shaped into the cylindrical surface without protrusion. This allows preventing the disengagement of the engaging protrusions 142 due to the housing 10 being stuck in another member in a device with the built-in optical connector 1, for example.

(10) Since the supporting protrusions 141 are partially received in the grooves 110b respectively provided in the periphery of the first cylindrical portion 11, it is possible to reduce the size (diameter) of the housing 10.

(11) When the engaging protrusions 142 are disengaged from the other ferrule 3, the engaging protrusions 142 are displaced in such a manner as to slip out from the communicating holes 110d respectively, resulting in the tip side (engaging protrusion 142 side) portions of the supporting protrusions 141 elastically deforming in such a manner as to circumferentially slip out from the grooves 110b respectively. The outer side of the supporting protrusions 141 is then not covered with another member (such as a cover or the like). This allows reducing the size of the housing 10 in comparison to the case where the housing 10 is provided with a covering portion for covering the outer side of the supporting protrusions 141, for example. That is, whereas providing such a covering portion requires providing sufficient spaces to allow the displacement of the engaging protrusions 142 on outer sides of the supporting protrusions 141 respectively, the present embodiment does not require doing so, therefore allowing the size reduction (diameter reduction) of the housing 10.

(12) The grooves 110b are formed in the axial direction in the periphery of the first cylindrical portion 11, and are open in the opposite surface of one end thereof to the base 140. This allows disposing the supporting protrusions 141 in the grooves 110b respectively, thereby facilitating the assembly of the first cylindrical portion 11 and the engaging member 14.

Although the invention has been described with respect to the above embodiment, the above embodiment is not intended to limit the appended claims. Also, it should be noted that not all the combinations of the features described in the above embodiment are essential to the means for solving the problems of the invention.

Further, although in the above embodiment it has been described that the first to the third cylindrical portions 11 to 13 are made of the resin, the first to the third cylindrical portions 11 to 13 are not limited thereto, but may be made of a metal such as aluminum, or the like. In this case, the first to the third cylindrical portions 11 to 13 may be interlocked together by, for example, a male and female thread screwing, or a press fit.

Also, although in the above embodiment it has been described that the fixed ferrule 2 is fixedly held to the housing 10, the third cylindrical portion 13 may be detachable from and attachable to the second cylindrical portion 12, and the fixed ferrule 2 may be demountable from the first cylindrical portion 11 and the second cylindrical portion 12. In this case, the housing 10 serves as an adapter to connect the two ferrules (the fixed ferrule 2 and the other ferrule 3) together. Configuring the third cylindrical portion 13 in such a manner as to be detachable from and attachable to the second cylindrical portion 12 can be achieved by, for example, forming a male thread on the outer surface of the protrusion 121 of the second cylindrical portion 12 and a female thread in the inner surface of the third cylindrical portion 13 and screwing these threads together.

Further, although in the above embodiment it has been described that the housing 10 has the circular cylindrical shape, but the shape of the housing 10 is not limited thereto, but the cross section of the outer surface of the housing 10 may be shaped into a polygonal (quadrangular, hexagonal, octagonal, etc.) tube.

Further, although in the above embodiment the housing 10 has been configured to receive the portions of the supporting protrusions 141 in the grooves 110b respectively, the configuration of the housing 10 is not limited thereto, but the housing 10 may also be configured in such a manner as to receive the entire supporting protrusions 141 in the grooves 110b respectively with the engaging protrusions 142 engaging the other ferrule 3.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A ferrule holding member, comprising:
   a tube-shaped receiving portion including a receiving space therein, the receiving space receiving at least partially a ferrule mounted to a terminal of an optical fiber; and
   an engaging portion engaged to the ferrule received in the receiving portion, to thereby regulate movement of the ferrule relative to the receiving portion,
   wherein the receiving portion includes a communicating hole to allow the receiving space to communicate externally,
   wherein the engaging portion includes an engaging protrusion configured to be inserted in the communicating hole from an outer periphery side of the receiving portion, to engage the ferrule,
   wherein the receiving portion includes a groove provided in an outer periphery and extended along a center axis of the receiving portion and an opening of the communicating hole provided in a bottom of the groove, the engaging portion includes a supporting portion to elastically support the engaging protrusion, and the supporting portion is at least partially disposed in the groove with the engaging protrusion engaging the ferrule,
   wherein the groove and the opening are located in two opposite areas around the center axis of the receiving portion, and two of the engaging portions are provided in correspondence with the grooves and the openings in the two areas, respectively.

2. The ferrule holding member according to claim 1, further comprising:
   gaps provided between the supporting portions and the bottoms of the grooves respectively, to insert tips of a tool into the gaps respectively to separate the supporting portions from the bottoms of the grooves respectively and disengage the engaging protrusion from the ferrule.

3. The ferrule holding member according to claim 1, wherein the receiving portion comprises a plurality of tube-shaped members interlocked together in an axial direction of the receiving portion, the engaging portion is a portion of an engaging member including a ring base sandwiched between the plurality of the tube-shaped members, and the supporting portion is connected to the base at one end.

4. An optical connector, comprising:
   a fixed ferrule mounted to a terminal of an optical fiber; and
   a ferrule holding member which fixedly holds the fixed ferrule,
   the ferrule holding member comprising:
   a tube-shaped receiving portion including a receiving space therein, the receiving space receiving at least partially a second ferrule mounted to a terminal of a second optical fiber; and
   an engaging portion engaged to the second ferrule received in the receiving portion, to thereby regulate movement of the second ferrule relative to the receiving portion,
   wherein the receiving portion includes a communicating hole to allow the receiving space to communicate externally,
   wherein the engaging portion includes an engaging protrusion configured to be inserted in the communicating hole from an outer periphery side of the receiving portion, to engage the second ferrule,
   wherein the receiving portion includes a groove provided in an outer periphery and extended along a center axis of the receiving portion and an opening of the communicating hole provided in a bottom of the groove, the engaging portion includes a supporting portion to elastically support the engaging protrusion, and the supporting portion is at least partially disposed in the groove with the engaging protrusion engaging the second ferrule,
   wherein the groove and the opening are located in two opposite areas around the center axis of the receiving portion, and two of the engaging portions are provided in correspondence with the grooves and the openings in the two areas, respectively.

* * * * *